United States Patent

[11] 3,586,340

[72] Inventors Dennis L. Otto
Canton;
Charles M. Allen; Craig T. Walters,
Columbus, all of, Ohio
[21] Appl. No. 832,894
[22] Filed June 13, 1969
[45] Patented June 22, 1971
[73] Assignee Timken Company
Canton, Ohio

[54] WEAR SURFACE AND SEAL CONSTRUCTION
23 Claims, 8 Drawing Figs.
[52] U.S. Cl. .................................................. 277/96,
277/134
[51] Int. Cl. .................................................. F16j 15/32
[50] Field of Search .......................................... 277/96,
133, 134, 153.2, 154

[56] References Cited
UNITED STATES PATENTS
2,497,225 2/1970 Workman ..................... 277/134
OTHER REFERENCES
Zero Leakage: Results of an Advanced Lip Seal Tech. by R. L. Dega Paper No. 67-WA/LUB-11, published by Journal of Lubrication Tech. pg. 1— 13, Jul. 18, 1967

*Primary Examiner*—Laverne D. Geiger
*Assistant Examiner*—Robert I. Smith
*Attorney*—Gravely, Lieder & Woodruff ABSTRACT: A seal construction for forming a lubricant barrier between relatively movable members including a wear or working surface on one of the members and a flexible seal element on the other member. The working surface is composed of a multiplicity of triangular asperities arranged in a simple geometric array, and these asperities are engaged by a seal face on the seal element. The depressions between the asperities permit lubricant to contact the seal face and prolong the life of the seal. Most of the triangular asperities point toward the lubricant side of the seal construction so that the sidewalls of the asperities serve as pump impellers for pumping the lubricant back toward the lubricant source. Some of the triangular asperities may be oriented in the opposite direction to maintain adequate lubricant flow underneath the seal face. The depressions may be filled with a soft filler material which during relative rotation in the presence of the lubricant wears and to a limited extent reestablishes the depressions beneath the seal face. In this manner, the depressions are maintained at an optimum depth as the asperities themselves wear.

INVENTORS:
DENNIS L. OTTO
CHARLES M. ALLEN
CRAIG T. WALTERS

BY Gravely, Lieder & Woodruff
ATTORNEYS.

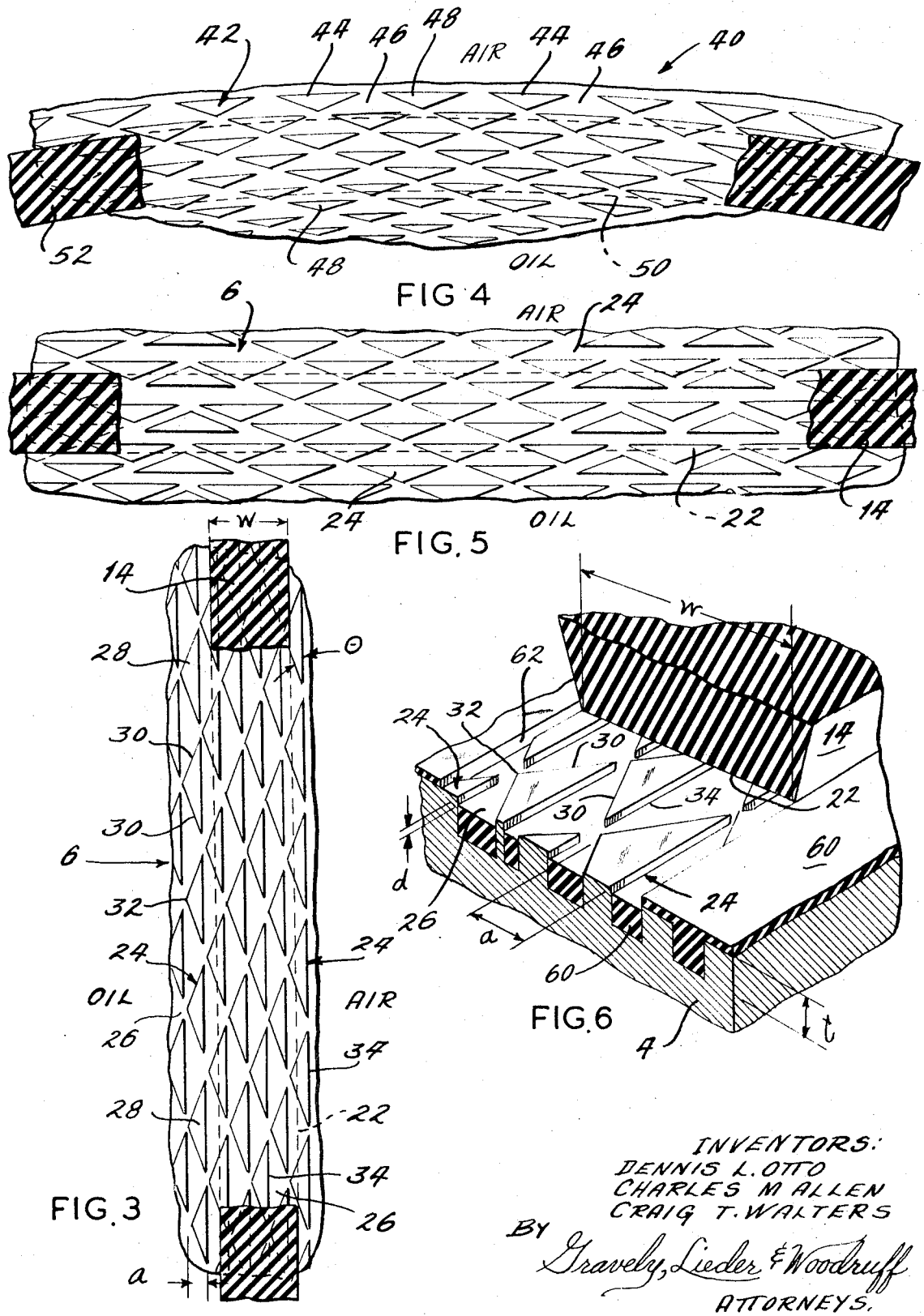

WEAR SURFACE AND SEAL CONSTRUCTION

BACKGROUND OF THE INVENTION

This invention relates in general to a wear surface and seal construction and more particularly to a wear surface for supporting movable elements in engagement therewith and to a seal construction having such a wear surface for forming a fluid barrier between two relatively moving members.

Bearings and other rotating mechanisms which are normally operated in a lubricating medium are generally provided with some sort of seal construction to prevent the lubricant from escaping the vicinity of the lubricated mechanism. Many of these seal constructions comprise an elastomeric seal element carried by one of two members which rotate relative to one another and a rigid wear or working surface on the other rotatable member. The elastomeric seal element bears against the working surface and thereby forms a barrier to the passage of lubricant across the area of contact.

Heretofore, it has been considered important to have the rigid working surface smooth, not only to avoid leakage, but also to reduce friction and of course the heat and wear inherent with friction. Indeed, expensive plunge grinding and polishing operations are often required to achieve this end, and such surfaces are, furthermore, subjected to exhaustive inspection procedures to insure that they do not contain pits, grooves, and other surface imperfections. While a smooth wear surface satisfactorily restricts lubricant seepage, at least at the outset, friction is not reduced, inasmuch as lubricant flow cannot be maintained between the surface and the seal to lubricate the seal itself. As a result, the seal heats excessively and after a short period of operation becomes hard and brittle. This loss of resiliency, in turn, is marked by a significant decline in the ability to seal. Thus, a smooth highly polished wear surface in the long run defeats the advantage it is supposed to provide.

SUMMARY OF THE INVENTION

One of the principal objects of the present invention is to provide a wear surface which permits the distribution of a lubricant throughout the area on it which is engaged by the face of an element movable relative thereto. Another object is to provide a seal construction which will overcome a great many of the present objections and form a durable and highly effective fluid barrier between relatively movable members. Yet another object is to provide a seal construction wherein adequate lubrication is provided at the seal forming contact. A further object is to provide a seal construction incorporating an elastomeric seal which remains resilient and does not become brittle and hard through prolonged usage. An additional object is to provide a seal construction which can be manufactured without resort to expensive grinding operations and exhaustive inspection procedures. Still another object is to provide a seal construction which pumps a lubricant back toward the source of such lubricant. A further object is to provide a seal construction in which small surface imperfections at the seal interface will not adversely affect the fluid barrier. These and other objects and advantages will become apparent hereinafter.

The present invention is embodied in a wear surface engaged by a face of an element movable relative thereto. The wear surface is composed of a multiplicity of closely spaced asperities separated by an intervening surface of a different elevation. This difference in elevation allows the lubricant to flow on the wear surface and contact the engaging face of the element. The asperities may be triangular in shape and oriented to pump the lubricant in a desired direction. The invention is further embodied in the presence of a filler material in depressions of the surface. The filler material is softer than the material constituting the asperities, and as the seal element moves relative to the wear surface, the filler material underlying the engaging face wears, thereby reestablishing the depressions to a limited extent between the asperities. The wear is such that an optimum depression depth is maintained as the asperities wear. The invention also encompasses the working surface apart from the seal element. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 3 is a fragmentary plan view showing the asperity array on the working surface of the seal construction illustrated in FIG. 1;

FIG. 4 is a fragmentary plan view showing a modified asperity array on a seal construction of the parallel face variety which also forms part of the present invention;

FIG. 5 is a fragmentary plan view of another modified asperity array;

FIG. 6 is a fragmentary perspective view, partially broken away and in section, of a modified seal construction of the circumferential lip variety;

DETAILED DESCRIPTION

Figure 1:
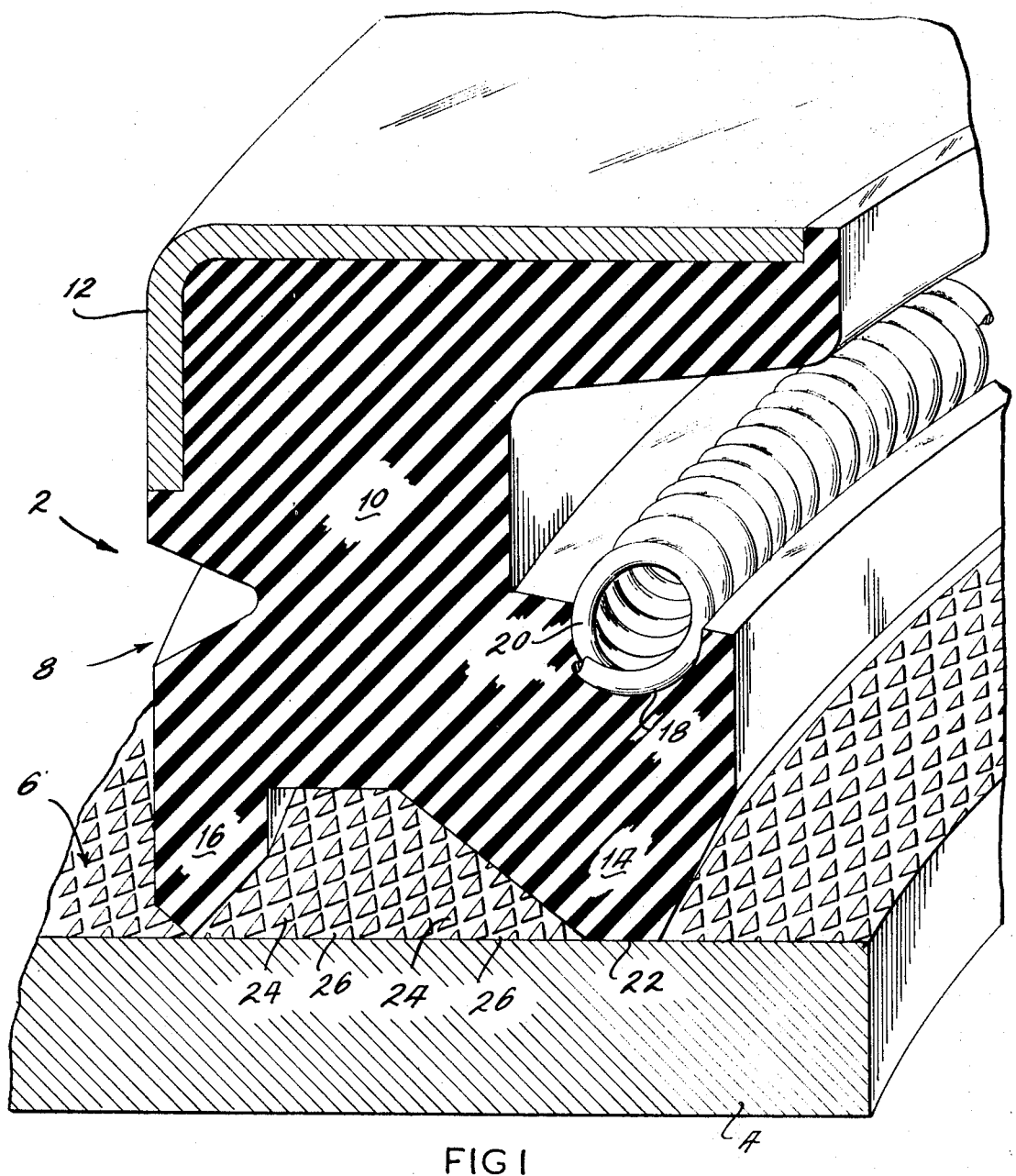
FIG. 1 is a sectioned perspective view of a seal construction of the circumferential lip variety constructed in accordance with and embodying the present invention.

Referring now in detail to the drawings, and in particular to FIG. 1, 2 designates a seal construction of the circumferential lip variety including a rigid wear ring or segment 4 having a cylindrical working or wear surface 6 which is embraced by an elastomeric lip seal 8. The seal 8 and wear ring 4 are mounted on members which rotate relative to one another so that the ring 4 rotates relative to the lip seal 8. For example, the wear ring 4 may be press-fitted onto a rail car axle adjacent to the cones of a roller bearing, and the seal 8 could be attached to the cup of that bearing.

More specifically, the lip seal 8 includes a body portion 10 which along its outer periphery is bonded to a rigid seal case 12 for mounting purposes. Inwardly therefrom the body portion 10 emerges into a pair of lips 14 and 16 which engage the wear surface 6. The lip 14 is somewhat wider than the lip 16 and forms a lubricant seal or barrier with the wear ring 4, whereas the lip 16 forms a dust seal with the wear ring 4. Thus, the oil side of the seal construction 2 is to the right of the lip 14, reference being made to FIG. 1, while the air or ambient side is to the left. The body portion 10 of the lip seal 8 is further provided with an outwardly opening circumferential groove 18 into which a garter spring 20 is fitted for urging the lip 14 snugly against the wear ring 4. The lip 14 engages the working surface 6 on the wear ring 4 along a generally cylindrical seal face 22 of axial width $w$ (FIG. 2).

Figure 2:
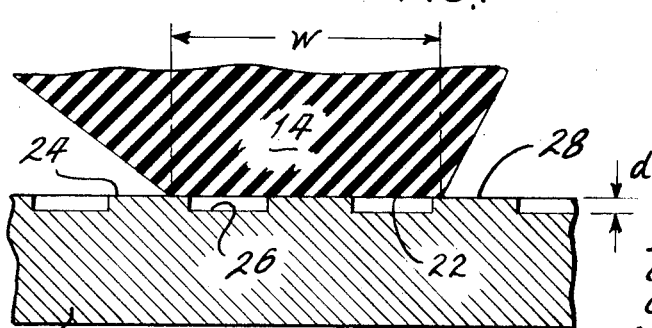
FIG. 2 is a sectional view of the seal construction shown in FIG. 1.

The cylindrical working surface 6 is actually composed of a multiplicity of triangular asperities 24 which are separated from one another by depressions 26 FIGS. 1—3). In other words, the asperities 24 are separated by an intervening surface of a lower elevation. Each asperity 24 includes an outwardly presented land 28 and the lands 28 of all the asperities 24 create an interrupted surface area disposed outwardly from the depressed or intervening surface area created by the depressions 26. Each asperity 24 is peripherally defined by angularly related sidewalls 30 and a base wall 34. The sidewalls 30 intersect at an apex 32 and a base wall 34 intersects each of the sidewalls 30 at equal angles. Accordingly, the shape of the raised land 28 of each asperity 24 is that of an isosceles triangle. Each triangular asperity 24 forming the array is oriented such that its apex 32 points toward the oil side of the seal construction 2 and its base wall 34 extends in the direction of relative rotation between the ring 4 and the lip 14. Thus, each sidewall 30 is presented oblique to the direction of relative rotation and, as will be presently more fully explained, this orientation of the sidewalls 30 permits them to serve as pump impellers. The asperities 24 are, furthermore, arranged to form a simple geometric array (FIG. 3), or in other words, they are arranged in successive circumferential rows with the base walls 34 of each row in alignment and forming successive circles about the working surface 6, while the sidewalls 32 of asperities 24 in adjacent rows are in alignment and describe crossed helicies across the working surface 6.

The lands 28 should cover one-third to two-thirds of the total area on the working surface 6 across which the asperities 24 extend. The dimensions of the asperities 24 are not critical but excellent results have been obtained with lands 28 ranging from about 0.005 to 0.040 inches in their shortest dimension $a$ (FIG. 3). Similarly, the asperity angle $\theta$ between each sidewall 30 and the base wall 34 it intersects is not critical, but an asperity angle $\theta$ of approximately 20° has proved acceptable for most lubricants. The depth $d$ of the asperities 24 (FIG. 2), that is the distance between the lands 28 and the bottoms of the depressions 26, should be between 10 and 100 microinches (0.000010 to 0.000100 inches). The width $w$ of the seal face 22 should be such that the seal face 22 extends axially across at least three circumferential rows of asperities 24. In actual practice, considerably more than three rows of asperities 24 should be provided on the working surface 6 to compensate for misalignment and flexure of the lip seal 8.

The asperities 24 may be machined into the working surface 6 of the wear ring 4 with conventional cutting tools and, similarly, they may be mechanically imposed such as by knurling. Machining and mechanical operations, however, are often impractical since the wear ring 4 is composed of a hardened material to prevent excessive wear. In any event, the outer surface of the wear ring 4 may be finished prior to the formation of the asperities 24 by a through grinding operation which is more economical than plunge grinding. The grooves resulting from this grinding, however, should not exceed the depth $d$ of the asperities 24.

A particularly effective method for obtaining the desired asperity working surface 6 on the wear ring 4 is to first mask a finished surface so as to provide the desired asperities 24 in relief and then chemically etch the exposed portions of the surface. Such masking may be accomplished in a wide variety of ways including lithographic or photographic techniques wherein a masked pattern is photographically reproduced on the wear ring surface, electrodeposition or electrostatic coating of a desired pattern, the use of decals, or practically any means of providing a pattern, coat, or print that will at least temporarily inhibit chemical etching in preselected areas to reproduce the desired etched pattern. Any chemical etchant capable of removing metal from the wear ring 4 whether acidic or basic in nature may be employed. A solution consisting of 5 parts nitric acid and 95 parts water maintained at a temperature of 70°—75°F has proved particularly successful.

When the lip seal 8 and working surface 6 are at rest, the flexible seal face 22 will tend to sink into the depressions 26. The distortion, however, is minimal due to the close spacing between the asperities 24. Leakage through the depressions 26 under static conditions is avoided by reason of the fact that the depth of the depressions 26 does not exceed the thickness of the fluid or lubricant film. That thickness is normally about 100 microinches. In other words, the depressions 26 are extremely shallow in their own right, and thereby inherently impede the passage of fluid through them due to the effects of surface tension. This enables the seal construction 2 to serve as a very effective static barrier or seal. Thus, the leakage past the lip seal 8 when the seal construction 2 is at rest is insignificant.

However, when the seal 8 rotates relative to the wear ring 4, the seal face 22 is lifted to the height of the cylinder defined by the lands 28 and the effects of surface tension are destroyed. Consequently, the lubricant works into the depressions 26 between the asperities 24 and fills the void so defined. The lubricant within the depressions 26 contacts the seal face 22 so that any given segment of the seal face 22 is supplied with a thin lubricant film as it traverses an adjacent land 28. Thus, the seal face 22 receives a continuous supply of lubrication which prevents the seal 8 from overheating, and this in turn avoids hardening of the seal 8 and the loss of flexibility which accompanies that hardening. Accordingly, the seal 8 remains flexible throughout long periods of operation which would destroy a conventional seal.

The asperities 24, furthermore, break up grinding and machining patterns and thereby eliminate the tendency of such patterns and surface defects such as dents and scratches to pump the the lubricant across the seal face 22.

Inasmuch as the sidewalls 30 of each asperity 24 are oblique to the circumferential path traversed by the asperity 24, the lubricant will be deflected away from the asperity 24 in the general direction of the apex 32 by the leading sidewall 30 on each asperity 24. In other words, the leading sidewalls 30 serve as pump impellers and move the lubricant toward its source or reservoir which is at the lubricant side of the seal construction 2. The trailing sidewall 30 has no effect on the lubricant until the direction of rotation is reversed, in which case it becomes the leading sidewall 30 and performs the pumping action. Since the base wall 34 is parallel to the circumferential path described by its asperity 24, it provides no pumping action whatsoever irrespective of the direction of rotation and, therefore, does not force the lubricant toward the air side of the bearing 2. By reason of the pumping action, the effectiveness of the lubricant barrier formed on the seal 20 at the engagement of the lip 14 and the working surface 6 is enhanced.

In order to improve hydrodynamic load support and to prevent guttering or grooving of the seal face 22, the axial spacing between successive circumferential rows of asperities 24 should be reduced to a minimum.

Referring now to FIG. 4, aside from the circumferential lip seal construction 2, the foregoing principles may in addition be employed in a seal construction 40 of the parallel face variety. Like the seal construction 2, the seal construction 40 includes a working surface 42 composed of a multiplicity of asperities 44 separated by depressions 46. The asperities 44, furthermore, outwardly terminate at lands 48, but the lands 48 are coplanar and perpendicular to the axis of rotation instead of segments of a large cylinder. The working surface 42 is engaged across the lands 48 of its asperities 44 by a seal face 50 forming part of an annular elastomeric face seal 52 (FIG. 8), and the seal face 50 is similarly planar and perpendicular to the axis of rotation instead of cylindrical. Thus, the asperities 44 are arranged in successive radially spaced rows instead of successive axially spaced rows as is the case with the working surface 6 in FIG. 1. The same parameters regarding asperity depth $d$, minimum dimension $a$, seal face width $w$, and the fraction of the total area occupied by the lands 48 apply to the seal construction 40. Similarly, the asperities 44 are arranged in simple geometric arrays. By reason of the arrangement in radially spaced rows, one distinction, however, is readily apparent, and that is the diminishing size of the asperities 44 in each successive row from the outermost to the innermost row. In other words, the asperities 44 closest to the axis of rotation are smallest, whereas those furthest from the axis of rotation are largest. In this connection, the base walls of the asperities 44 are arcuate, and thereby form concentric circles about the wear surface 42, but since the circumferential length of each asperity 44 is indeed small compared to the circumference of the seal face 42 they appear straight. Since the seal face 50 need cover only a few circumferential rows of asperities 44, no trouble is encountered in keeping the minimum dimension $a$ of each asperity 44 between 0.005 and 0.040 inches.

The seal construction 40 operates similar to the seal construction 2, only the leading sidewalls of asperities 44 pump the lubricant generally radially instead of axially. In the array illustrated in FIG. 4, the lubricant reservoir is located toward the axis of rotation and, consequently, the apexes of asperities 44 point in that direction. To pump in the opposite direction the orientation of the asperities 44 need only be reversed, in which case the apexes would point radially outwardly instead of inwardly.

The effectiveness of the asperities 24 insofar as the pumping action is concerned is dependent on many factors such as the asperity angle $\theta$, the length of the sidewalls 30, the width of the depressions 26 between adjacent asperities 24, the operating speed, the lubricant viscosity, the operating temperature, the sealing force at the seal face 22, and the thickness of the lubricant film. In some instances, these conditions are all such that the pumping action is too effective and the outermost asperities 24 of the array and the portion of the seal face 22 which traverses those asperities do not receive adequate lubrication. As will be seen by reference to FIG. 5, this lubricant starvation can be overcome by orienting a portion of the asperities 24 in the opposite direction, that is, with their apexes 32 pointing axially outwardly toward the air side of the seal construction 2 instead of inwardly toward the lubricant so that they will pump in the opposite direction. This arrangement of the asperities 24 restores lubricant circulation throughout the entire asperity array traversed by the seal face 22 so that the seal face 22 is constantly lubricated across its entire width. Arranging the oppositely oriented asperities 24 in circumferentially extending sections interposed between circumferentially extending sections of inwardly oriented asperities 24, as illustrated in FIG. 5, forms a highly satisfactory lubricant seal and has proved to be superior to interspersing individual oppositely oriented asperities 24 among the inwardly directed asperities 24. An array having 30 percent of the asperities pointing outwardly toward the air side of the seal construction 2 and the remainder pointing inwardly toward the lubricant side has appeared to be the most suitable array for railway applications. This pattern provided adequate lubrication to the seal face 22 by permitting circulation of the lubricant back into the asperity array, yet still eliminated leakage problems.

In a like manner, a segment of the asperities 44 forming part of the parallel face seal construction 40 (FIG. 4) may be reversed to provide the same advantages, in which case the apexes of some of the asperities 44 would point radially outwardly, while others would point radially inwardly. Again, it is desirable to arrange the reversely oriented asperities in groups instead of randomly scattering them through the array.

While hydrodynamic lubrication is excellent when the depth $d$ of the asperities 24 is between 10 to 100 microinches, these dimensions cannot be maintained over extended periods of time where relatively high seal loads are employed, such as those generated by strong garter springs 20. This results from the fact that the wiping action of the lip seal 8 across the wear ring 4 in time wears the asperities 24 until they are substantially obliterated and no longer effective. Of course, deeper asperities 24 on the order of 500 microinches in depth can be used from the outset, but until such asperities 24 wear down to approximately 100 microinches, excessive amounts of lubricant will leak through the depressions 26. With lighter seal loads this wear problem is not nearly so pronounced.

Figure 7:
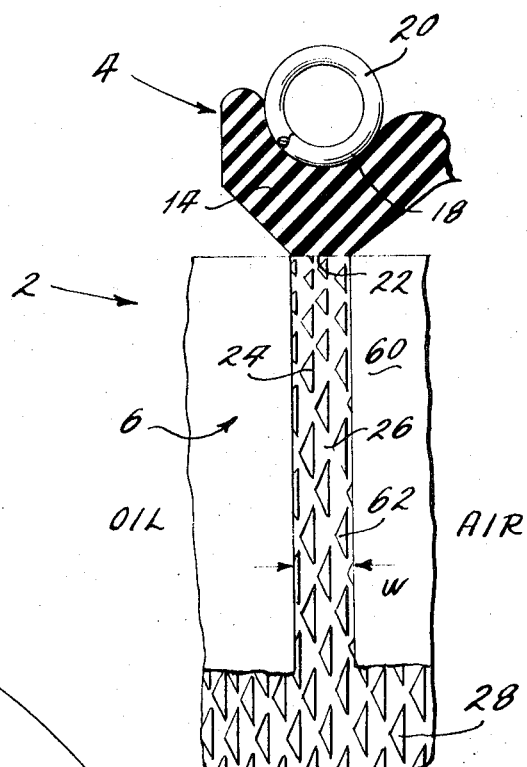
FIG. 7 is an elevational view, partially broken away and in section, of the modified circumferential lip seal construction of FIG. 1.

As illustrated in FIGS. 6 and 7, this problem is overcome by utilizing a deep etched pattern in which the asperities 24 have a true depth $t$ of up to 500 microinches. The depressions 26 are subsequently filled with and the lands 28 covered by a thin coating 60 which is less resistant to wear than the material from which the wear ring 4 is formed. Plastic filler materials are suitable for this purpose, and of all the plastic fillers tested, polyurethane containing 20 percent by weight of microfine molybdenum disulfide appeared to give the best results. This material was sprayed onto the surface 6 of the asperity etched wear rings 4.

When the wear ring 4 provided with a coating 60 of the filler material is placed in operation, the lip 16 will, during a relatively short run-in period, cut a wear path 62 (FIG. 7) through the coating 60, and that path 62 will be substantially equal in width to the width $w$ of the seal face 22. When the lands 28 of the asperities 24 are exposed, the coating 60 will continue to wear in the areas intermediate the asperities 24, that is at the depressions 26, until a differential of between 25 and 100 microinches is established between the exposed coating surface in the depressions 26 and the lands 28. The exact depth of this differential is the effective depth $d$ of the asperities 24, and it is dependent on many conditions such as the flexibility of the lip seal 8, the radial seal force imparted by the garter spring 20, the constituency of the lubricant, and the peripheral velocity of the ring 4. As the asperities 24 wear through continued operation, so does the coating 60 in the depressions 26 between the asperities 24, and this wear is such that the same differential or effective asperity depth $d$ is maintained. Thus, an optimum effective depth $d$ is maintained while the seal 20 wears through the entire 500 microinches of asperities 24, and this requires considerable time. The optimum effective depth $d$ decreases rapidly as wear occurs beyond the point of obliteration of the filler material coating 60. The asperity effectiveness is reduced as the pattern becomes less well defined and as the effective depth $d$ decreases during the propagation of the pattern through the base material of the wear portion 4 until the pattern is eventually completely obliterated. Thus, after the coating 60 has worn away, the asperities 24 are self-generating to a limited extent.

Figure 8:
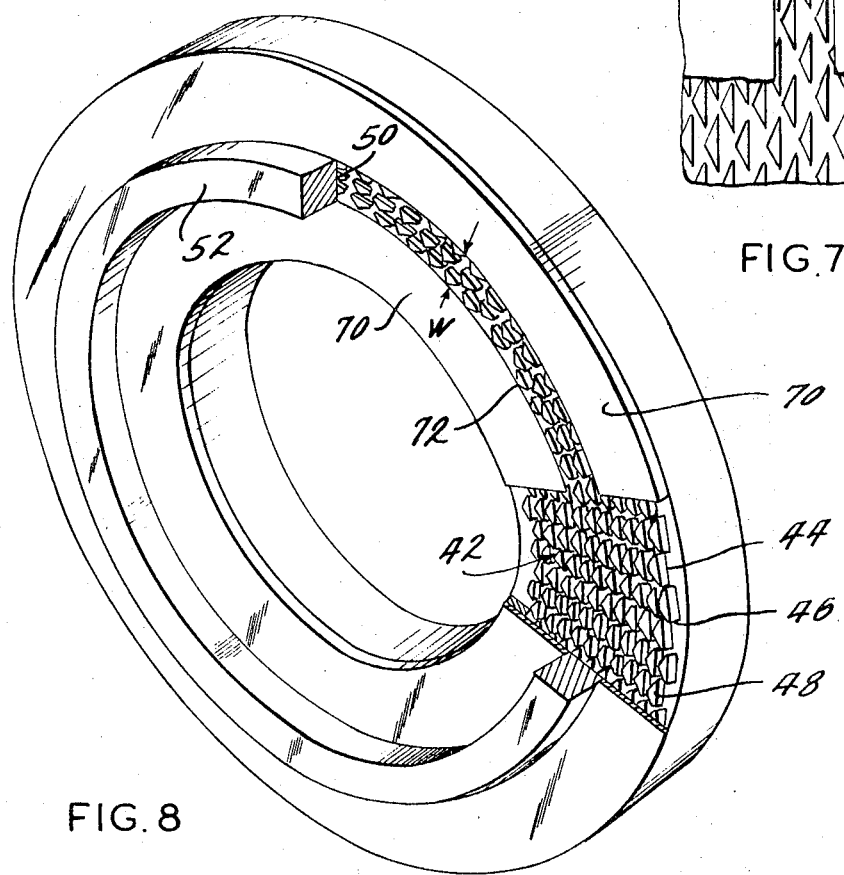
FIG. 8 is a perspective view of the modified seal construction of FIG. 6 incorporated into a parallel face seal construction.

Turning now to FIG. 8, the asperities 44 of the parallel face seal construction 40 may also be formed in extended lengths of up to 500 microinches and then covered with a coating 70 similar in composition to the coating 60. The seal face 50 of the seal 52 will in time wear a path 64 through the coating 70 and expose the lands 48. The coating 70 between the asperities 44 engaged by the seal face 50 will similarly continue to wear until a wear condition is reached in which the effective asperity depth $d$ remains somewhere between 25 and 100 microinches until the asperities 44 are obliterated.

While the asperities 24 and 44 illustrated and previously discussed herein are all of the positive variety, that is, they project outwardly from an intervening surface, they may also be of the negative variety, in which case they would form individual pockets or depressions in an intervening surface and the combined outwardly presented surfaces of these pockets would constitute an interrupted surface area. The seal faces 22 or 50, whatever the case may be, would therefore engage and ride on the intervening surface area instead of the lands or interrupted surface area. The pumping effect with negative asperities is the reverse of that provided by the positive asperities 24 and 44 heretofore described, and, accordingly, negative asperities should be oriented with their apexes pointing in the opposite direction.

This invention is intended to cover all changes and modifications of the example of the invention herein chosen for purposes of the disclosure which do not constitute departures from the spirit and scope of the invention.

What we claim is:

1. A wear surface for engaging a face of an element movable relative thereto in the presence of a lubricant; said wear surface comprising a multiplicity of closely spaced lands, an intervening surface separating the lands and located at a different elevation from the lands so as to form a depressed portion in the wear surface, a filler material in the depressed portion and being less resistant to wear than the lands, whereby during relative movement in the presence of the lubricant the filler material in the depressed portion will wear and to a limited extent will establish voids beneath the seal face so that the lubricant can flow through the voids and lubricate the engaging face of the element.

2. A wear surface according to claim 1 wherein the filler material is a plastic substance; and wherein the element is formed from an elastomeric substance.

3. A seal construction according to claim 1 wherein the initial depth of the depressed portion exceeds 100 microinches; and wherein the effective depth of the voids measured from the ends of the lands to the exposed surfaces of the filler material underlying the engaging face in the depressed portion remains between approximately 25 and 100 microinches as the lands and filler material wear due to the passage of the engaging face over the wear surface.

4. A wear surface for engaging an element movable relative thereto in the presence of a lubricant; said wear surface comprising a substantially interrupted surface area and a substantially continuous intervening surface area both presented toward the movable element, the interrupted surface area comprising a multiplicity of closely spaced individual surfaces substantially separated from each other by the intervening surface area so that each individual surface is generally surrounded by the intervening surface area, one surface area being located closer to and the other surface area being farther from the element, whereby one surface area is raised and the other surface area is depressed; and a filler material covering the depressed surface area, the filler material being less resistant to wear than the material from which the raised surface area is formed.

5. A wear surface according to claim 4 wherein the element is rotatable relative to the wear surface; wherein the triangular surfaces are arranged in circumferentially extending rows; and wherein the base walls of adjacent triangular surfaces in each circumferential row align.

6. A wear surface according to claim 5 wherein the sidewalls of the triangular surfaces align with the sidewalls of triangular surfaces in adjacent circumferential rows so that the triangular surfaces form a simple geometric array.

7. A wear surface according to claim 5 wherein the engaging face of the element extends across at least three circumferentially extending rows; and wherein the element is formed from an elastomeric substance.

8. A wear surface according to claim 7 wherein the interrupted surface area occupies approximately one-third to two-thirds of the outwardly presented surface areas of the wear surface.

9. A wear surface according to claim 4 wherein the intervening and interrupted surface areas are formed on and from the same material.

10. A wear surface according to claim 9 wherein the filler material initially extends outwardly to at least the raised surface areas whereby in the presence of the lubricant the filler material covering the depressed surface area will wear and to a limited extent will establish a void beneath the element so that the lubricant can occupy the void and lubricate the face of the element which engages the raised surface area.

11. A wear surface according to claim 4 wherein the intervening surface area is depressed and the interrupted surface area is raised whereby the interrupted surface area forms a plurality of lands.

12. A wear surface for engaging the face of an element movable relative thereto in the presence of a lubricant; said wear surface comprising a substantially interrupted surface area and an intervening surface area both presented toward the face of the element, the interrupted surface area comprising a multiplicity of closely spaced triangular surfaces generally surrounded by the intervening surface area and substantially separated from each other by the intervening surface area, one of the surface areas being located closer to the movable element than the other surface area and the distance between the two surface areas being between approximately 10 microinches and 100 microinches whereby one surface area is raised and the other is depressed, each triangular surface being peripherally defined substantially by a base wall which extends in the general direction of relative movement and a pair of angularly related sidewalls which intersect at an apex pointing transversely of the direction at relative movement, the included angles between both sidewalls and the base wall being acute angles whereby the sidewalls will function as pump impellers for pumping the lubricant generally transversely of the direction of relative movement, the dimension of each triangular surface measured transversely of the direction of relative movement being between approximately 0.005 and 0.040 inches, the triangular surfaces being arranged in nonoverlapping rows extending in the direction of relative movement and the face of element traversing a plurality of the rows.

13. A wear surface according to claim 12 wherein the intervening surface area is depressed and the interrupted surface area is raised, whereby the interrupted surface area forms a plurality of individual lands.

14. A wear surface according to claim 13 wherein the sidewalls bounding the triangular surfaces in any row align with the sidewalls of triangular surfaces in adjacent circumferential rows so that the triangular surfaces form a simple geometric array.

15. A wear surface according to claim 13 wherein the lands are substantially nondeformable and the element is formed from an elastomeric substance.

16. A wear surface engaged by the face of an element movable relative thereto in the presence of a lubricant; said wear surface comprising a substantially interrupted surface area and an intervening surface area both presented toward the movable element, the interrupted surface area comprising a multiplicity of triangular surfaces generally surrounded by the intervening surface area and substantially separated from each other by the intervening surface area, one of the surface areas being located closer to the movable element than the other surface area whereby one surface area is raised and the other is depressed, each triangular surface area being defined by a base wall extending in the general direction of relative movement and a pair of angularly related sidewalls which intersect at an apex pointing transversely of the direction of relative movement whereby the sidewalls function as pump impellers for pumping the lubricant transversely of the engaging face of the element, a majority of the triangular surfaces having their apexes pointing in the same transverse direction and a minority of the triangular surfaces having their apexes pointing in the opposite transverse direction, whereby the lubricant is distributed thoroughly across the engaging face of the element.

17. A wear surface according to claim 16 wherein the majority of triangular surfaces are arranged in rows extending in the direction of relative movement, and wherein the width of the engaging face on the element is at least as wide as the width of three rows of triangular surfaces.

18. A wear surface according to claim 16 wherein the intervening surface area is depressed and the interrupted surface area is raised, whereby the interrupted surface area forms a plurality of individual lands.

19. A wear surface according to claim 18 wherein the lands are relatively nondeformable, and the engaging element is formed from an elastomeric material.

20. A wear surface according to claim 19 wherein the element which engages the wear surface is a flexible seal element whereby the seal element and wear surface in combination form a seal construction having an oil side and an ambient side; and wherein the net pumping effect of the sidewalls along the triangular surfaces is toward the oil side of the seal construction.

21. A wear surface according to claim 16 wherein the element and wear surface form a lubricant barrier having an oil side beyond which a supply of lubricant is maintained, and wherein the net pumping effect of the sidewalls along the triangular surfaces is toward the oil side.

22. For use in forming a lubricant barrier with a flexible elastomeric seal element having a seal face; a wear surface formed from a rigid material and engaged by the seal face; said wear surface comprising a multiplicity of closely spaced triangular lands and an intervening surface generally surrounding each land and substantially separating the lands from each other, both the lands and the intervening surface being presented toward the seal element face with the intervening surface being located further from the seal element face than the lands so as to form a depression between the lands for enabling the lubricant to pass under and lubricate the seal face when the wear surface and element move relative to each other, the effective distance between the lands and the intervening surface being between approximately 10 and approximately 100 microinches, each triangular land being peripherally defined by a base wall extending generally in the direction of relative movement between the wear surface and seal element and a pair of angularly related sidewalls located oblique to the direction of movement between the wear surface and seal element, the sidewalls intersecting at an apex pointing transversely of the direction of relative movement and the included angle between each sidewall and the base wall being an acute angle; the triangular lands being arranged in rows extending in the direction of relative movement, the base walls of the lands in each row being in alignment and the apexes of the lands in each row pointing in the same direction, the width of three successive rows of lands being less than the width of the seal face whereby the seal face will traverse at least three rows of triangular lands.

23. The structure according to claim 22 wherein the sidewalls of the triangular lands of one row align with the sidewalls of triangular lands of the adjacent rows so that the triangular lands form a simple geometric array.

UNITED STATES PATENT OFFICE
CERTIFICATE OF CORRECTION

Patent No. 3,586,340                     Dated June 22, 1971

Inventor(s)    Dennis L. Otto et al.

It is certified that error appears in the above-identified patent and that said Letters Patent are hereby corrected as shown below:

On the cover sheet "References Cited", "2,497,225" should read -- 3,497,225 --.

Signed and sealed this 2nd day of May 1972.

(SEAL)
Attest:

EDWARD M. FLETCHER, JR.                   ROBERT GOTTSCHALK
Attesting Officer                         Commissioner of Patents